(12) United States Patent
Simon et al.

(10) Patent No.: US 11,201,577 B2
(45) Date of Patent: Dec. 14, 2021

(54) DRIVE WITH INTEGRATED DYNAMIC LOAD CONTROL

(71) Applicant: Bauer Gear Motor GmbH, Esslingen (DE)

(72) Inventors: Karl-Peter Simon, Grünstadt (DE); Walter Trümpler, Karlsruhe (DE)

(73) Assignee: Bauer Gear Motor GmbH, Esslingen (DE)

( * ) Notice: Subject to any disclaimer, the term of this patent is extended or adjusted under 35 U.S.C. 154(b) by 94 days.

(21) Appl. No.: 16/636,073

(22) PCT Filed: Aug. 30, 2017

(86) PCT No.: PCT/EP2017/071739
§ 371 (c)(1),
(2) Date: Feb. 3, 2020

(87) PCT Pub. No.: WO2019/042537
PCT Pub. Date: Mar. 7, 2019

(65) Prior Publication Data
US 2020/0169209 A1 May 28, 2020

(51) Int. Cl.
*B63H 21/20* (2006.01)
*H02P 27/02* (2016.01)
(Continued)

(52) U.S. Cl.
CPC .............. *H02P 27/02* (2013.01); *H02H 3/38* (2013.01); *H02H 7/085* (2013.01); *H02K 3/28* (2013.01);
(Continued)

(58) Field of Classification Search
CPC .......... H02P 27/02; H02P 7/295; H02P 25/18; H02K 11/27; H02K 11/33; H02K 3/28; H02H 3/38; H02H 7/085
See application file for complete search history.

(56) References Cited

U.S. PATENT DOCUMENTS

| 4,616,179 A | 10/1986 | Braun |
| 2011/0006720 A1 | 1/2011 | Naiman |

(Continued)

FOREIGN PATENT DOCUMENTS

| DE | 16 13 936 A1 | 3/1971 |
| DE | 42 09 167 A1 | 9/1993 |

(Continued)

OTHER PUBLICATIONS

International Search Report issued in International (PCT) Application No. PCT/EP2017/071739 (dated May 8, 2018).

(Continued)

*Primary Examiner* — Muhammad S Islam
(74) *Attorney, Agent, or Firm* — Reising Ethington P.C.

(57) ABSTRACT

A drive with integrated dynamic load control includes a three-phase asynchronous motor having three phase legs connected in a star circuit, each phase leg having a winding having a coil end connected to a common star point. A load control circuit has a regulating module, an ammeter, a voltmeter and first and second switches. The ammeter and voltmeter detect a phase current and a phase voltage in one phase leg. The regulating module calculates an active power of the phase leg and a total active power of the motor responsive to the phase current and phase voltage. The switches are arranged in two of the phase legs between the respective coil end and the star point and the regulating module interrupts the two phase legs by using the switches when the active power, the total active power or a torque calculated from the total active power exceeds an adjustable limit value.

15 Claims, 4 Drawing Sheets

(51) Int. Cl.

| | |
|---|---|
| *H02K 11/27* | (2016.01) |
| *H02K 11/33* | (2016.01) |
| *H02H 3/38* | (2006.01) |
| *H02H 7/085* | (2006.01) |
| *H02K 3/28* | (2006.01) |
| *H02P 7/295* | (2016.01) |
| *H02P 25/18* | (2006.01) |

(52) U.S. Cl.
CPC ............. *H02K 11/27* (2016.01); *H02K 11/33* (2016.01); *H02P 7/295* (2013.01); *H02P 25/18* (2013.01)

(56) References Cited

U.S. PATENT DOCUMENTS

| | | | | |
|---|---|---|---|---|
| 2012/0083173 A1* | 4/2012 | McMillan | ............... | B63H 23/30 |
| | | | | 440/6 |
| 2015/0268133 A1* | 9/2015 | Ranjan | ................ | G06F 11/2205 |
| | | | | 702/183 |
| 2019/0348940 A1* | 11/2019 | Li | ........................... | H02P 25/22 |

FOREIGN PATENT DOCUMENTS

| | | |
|---|---|---|
| DE | 42 29 554 C2 | 12/1994 |
| DE | 101 00 159 A1 | 10/2001 |
| DE | 102 51 928 A1 | 6/2004 |
| EP | 1 046 971 B1 | 10/1999 |
| JP | S58 75495 A | 5/1983 |
| WO | 2014/160518 A1 | 10/2014 |

OTHER PUBLICATIONS

Written Opinion issued in International (PCT) Application No. PCT/EP2017/071739 (dated May 8, 2018).
Machine (English) Translation of DE 42 09 167 A1.
Machine (English) Translation of DE 42 29 554 C2.
Machine (English) Translation of DE 102 51 928 A1.
Machine (English) Translation of EP 1 046 971 B1.
Examination Report issued in corresponding European Patent Application No. 17777169.8 (dated Aug. 16, 2021).
English (machine) translation of Examination Report issued in corresponding European Patent Application No. 17777169.8 (dated Aug. 16, 2021).

* cited by examiner

DRIVE WITH INTEGRATED DYNAMIC LOAD CONTROL

CROSS-REFERENCE TO RELATED APPLICATIONS

This application is the national stage application of International Application No. PCT/EP2017/071739, filed Aug. 30, 2017, which designates the United States of America. The International Application is incorporated herein by reference in its entirety.

FIELD OF THE INVENTION

The invention relates to a drive having an integrated dynamic load control.

TECHNICAL BACKGROUND

Overload clutches, i.e., automatic clutches, which are controlled by the transmitted torque, are known from the prior art. For example, the overload clutches are coupled in the drive train between the motor and the driven mechanical load, in order to protect the components of the drive train. In the event of an overload, the overload clutch decouples the motor from the rest of the drive train.

Furthermore, various embodiments of motor protection circuits are known from the prior art which bring about an automatic switching-off of the motor in the event of an overload of the motor. These motor protection circuits are arranged on the connection side, i.e. between the voltage supply and the motor.

DESCRIPTION

It is an object of the invention to provide a drive with integrated dynamic load control and thereby render the mechanical overload clutch in the drive train between the motor and the mechanical load unnecessary. Further objects will become apparent from the following descriptions.

According to one aspect of the invention, the three-phase asynchronous motor is a three-phase asynchronous motor connected in a star circuit.

Three-phase asynchronous motors generally have three phase legs. Each phase leg may comprise one field winding or a plurality of field windings of the stator, depending on the pole pair number.

If the phase legs in the case of a three-phase asynchronous motor are connected in a star circuit, the phase legs each have at least one field winding having a coil start on the outer conductor side and a coil end situated on the other side of the field winding. Star lines coupled to the coil end converge in a common star point and are connected there.

Preferably, the three-phase asynchronous motor is a mains-fed three-phase asynchronous motor. In other words, the three-phase asynchronous motor is preferably connected directly, i.e. without a frequency converter, to a three-phase power supply.

According to a further aspect of the invention, the drive with integrated dynamic load control comprises a load control circuit.

The load control circuit may have a regulating module and at least one first ammeter, at least one first voltmeter and at least one first and one second semiconductor switch.

The first ammeter may be designed to detect a first phase current in a first phase leg of the motor.

The first voltmeter may be designed to detect a first phase voltage at the first phase leg.

The regulating module can be designed to calculate an active power of the first phase leg and in particular a total active power of the motor by means of the first phase current and the first phase voltage. The active power and in particular the total active power is a good indicator of the load and the correct functioning of the drive train (including the correct function of the driven mechanical load).

According to a further aspect of the invention, the first and second semiconductor switches may be arranged in two of the three phase legs between the respective coil end and the star point. In other words, the respective semiconductor switch can be arranged on the star side of the field winding in the phase leg. The same can apply to further semiconductor switches in further phase legs.

The field windings upstream of the semiconductor switch form an effective protection against interfering influences (such as voltage spikes) from the grid. The switching processes of the semiconductor switches are thus decoupled from the feeding network. It is thus possible to select semiconductor switches with a lower dielectric strength (for<example 1 kV), for example TRIACS (triode for alternating current).

According to a further aspect of the invention, the regulating module can be designed to interrupt at least the two of the three phase legs by means of the first and second semiconductor switches. The regulating module can interrupt the at least two phase legs by means of the semiconductor switches when it determines a faulty operating state. For example, it can be an overload or a blocking of the drive train, or of the driven mechanical load. The same can apply to the further phase legs.

According to a further aspect of the invention, the regulating module detects the faulty operating state by comparing a measured or calculated characteristic to a predetermined limit value. The limit value can be adjustable, in particular to adapt the limit value to the load profile of the driven mechanical load. By way of example, the characteristic may be a phase current.

Advantageously, the regulating module can also calculate an instantaneous active power of the phase leg from phase voltage and phase current. Furthermore, the total active power of the motor can be calculated by the addition of the instantaneous active power of all phase legs.

Furthermore, the output torque of the drive, of the motor and/or of the drive train, or of its components, and alternatively also the absorbed torque of the driven mechanical load, can be determined from the total active power and the rotational speed of the motor.

If the determined active power of the phase leg, the total active power or the torque of the motor calculated from the total active power exceeds a corresponding (adjustable) predetermined limit value, the regulating module controls at least the first and the second semiconductor switch, in order to electrically interrupt at least the two of the three phase legs.

If the phase voltage and the phase current are determined in only one phase leg, for the determination of the total active power over half the period duration or a multiple of half the period duration of the three-phase system must be integrated. The measurement can be started and ended at any time. In other words, the measurement can take place independently of the phase position of the three-phase current. However, the precondition is that the measurement period corresponds to half a period duration or a multiple of half the period duration. This results in a time delay of at least half a period, for example 10 ms, for a 50 Hz three-phase system.

However, if phase voltages and phase currents are determined in all phase legs, the total active power can be determined by the phase-by-phase multiplication of the instantaneous phase currents and phase voltages and the subsequent addition of the instantaneous phase active powers. The determination of the total active power can thus advantageously be determined for each point in time and quasi immediately.

In the case of single-phase measurement, an overload can thus be detected in approximately 10 ms. The load control circuit according to the invention can be switched off in less than 20 ms. This very short reaction time of the load control circuit of less than 60 ms and advantageously less than approximately 30 ms is surprisingly sufficient to protect the drive train and in particular the driven mechanical load as well from damage in the event of an error.

In the case of a multiphase measurement in all phases, an overload can even be detected virtually without delay. Shutdown can take place within approximately 10 ms.

According to a further advantageous aspect of the invention, the load control circuit may further comprise a communication module. The communication module may be designed to transmit drive characteristics and/or drive state data to a remote system. The communication module may furthermore be designed to receive control data of the remote system.

For this purpose, the communication module can have a communication interface.

The communication module can communicate with the remote system via the communication interface. For example, the communication interface may be connected to a bus system, to a network, or to a point-to-point connection, such as, for example, in the case of an IO link.

The drive characteristics data may include motor characteristics and/or transmission characteristics of an electronic identification plate of the drive; thereby, the drive characteristics can correspond to the "eCl@ss" classification.

The drive state data may include load profile data and/or predictive maintenance (wear parameters) state data.

According to a further advantageous aspect, the drive can be designed to be controlled in terms of power, and in particular to be switched on and off, by means of the control data of the remote system.

The drive is made "Industry 4.0"-compliant by the communication module. Via the polling of load profiles, the future energy requirement can be deduced with knowledge of historical data. The necessary energy requirement can be optimized using such data.

According to a further advantageous aspect, the drive characteristic data can be stored in a non-volatile memory. The non-volatile memory can be arranged directly in or on the drive. The non-volatile memory can remain on the drive even if, for example, the load control circuit has to be replaced due to a defect. The load control circuit may be configured to read out the nonvolatile memory and to adopt the drive characteristic data.

According to a further advantageous aspect of the invention, the first ammeter may be designed and arranged to detect the first phase current in the first phase leg between the coil end and the star point. In other words, the entire ammeter or at least one current measuring probe of the ammeter can be arranged on the star side of the field winding between coil end and star point.

According to a further advantageous aspect of the invention, the first ammeter can determine the first phase current by means of a first shunt. The first shunt may be arranged in the first phase leg connected in series between the coil end and the star point. The current measurement via a shunt resistor is relatively simple. In the case of large drive powers, however, the power loss at the shunts is correspondingly large. In the case of large drive powers, the phase current is therefore preferably to be determined according to another measuring principle.

For this reason, it may make sense in the case of large drive powers (several kilowatts; for example, motors with a drive power of more than 3 kW) to determine the phase current and the phase voltage in only one phase leg.

According to a further advantageous aspect of the invention, the first voltmeter can be designed to detect the first phase voltage in the first phase leg at the field winding.

The potential difference between the coil start of the field winding and the star point, or between the outer conductor and the star conductor, is advantageously measured for this purpose. In this way, the current and voltage measurement can take place at the same reference potential (in the star point) and correspondingly be carried out without electrical isolation.

According to a further advantageous aspect of the invention, the load control circuit may further comprise a first voltage divider. The first voltage divider may be connected in parallel to the field winding of the first phase leg. The first voltage divider may include a first resistor and a second resistor. The voltage divider may be used to measure the phase voltage directly against the common reference potential at the star point. Electrical isolation is therefore not necessary.

According to a further advantageous aspect of the invention, the load control circuit can be arranged and designed with respect to the further phase legs in such a way that it corresponds to the configuration with respect to the first phase leg.

In this way, the first ammeter can be designed to detect an associated phase current in each phase leg.

The first voltmeter can be designed to detect an associated phase voltage for each phase leg in each case.

The regulating module can be designed to calculate a total active power by means of the respective phase currents and the respective phase voltage.

The measurement of the phase currents and phase voltages in all phase legs enables the immediate determination of the total active power and the very fast overload detection within a few milliseconds. This very short reaction time of the load control circuit (shorter than approximately 60 ms; advantageously shorter than approximately 30 ms) is surprisingly sufficient to protect the drive train and in particular the driven mechanical load as well from damage in the event of an error.

According to one advantageous aspect, an associated semiconductor switch can be arranged in all phase legs between the respective coil ends and the star point. Advantageously, the regulating module can be designed to interrupt all phase legs by means of the semiconductor switches when a limit value exceedance is detected. As a result, the entire motor can be de-energized within a very short time and the field windings can be interrupted at the star point. This leads to a substantially delay-free unencumbered rotation of the rotor. The drive train is immediately disencumbered.

The limit value exceedance may be a limit value exceedance of the total active power or a limit value exceedance of a torque calculated from the total active power.

According to one advantageous aspect, the load control circuit can in each case have an associated ammeter, an associated voltmeter and an associated semiconductor switch for each further phase leg.

The respectively associated ammeters can be designed to detect an associated phase current in each case in the phase legs. The respectively associated voltmeters can be designed to detect an associated phase voltage on the phase legs in each case. The regulating module can be designed to calculate a total active power by means of the respective phase currents and the respective phase voltage. An associated semiconductor switch can be arranged in all phase legs between the respective coil ends and the star point.

According to a further advantageous aspect of the invention, the regulating module can be designed to drive the semiconductor switches as power dividers. The regulating module can be designed to actuate the semiconductor switches in such a way that the effective voltage in the phase legs can be set by means of the semiconductor circuit via a phase-fired control.

The regulating module can have a soft-start control. The soft-start control can be designed to reduce the effective voltage in the phase legs when the motor is switched on and to increase it over a predetermined period of time to the full line voltage. In this way, the starting current can be limited.

Additionally or alternatively, the regulating module can have a partial load control. The partial load control can be designed to determine a partial load factor from the active power and a rated motor power. When an undershooting of a partial load factor limit value is determined, the regulating module can correspondingly lower the effective voltage in the phase legs by means of the semiconductor switches as power dividers. In this way, the efficiency of the motor in part-load operation can be increased.

According to a further advantageous aspect of the invention, all measured phase currents and all measured phase voltages can be measured against a common reference point (or a common reference potential). The common reference point or reference potential can be the star point or the potential of the star point.

The reference point can of course be formed by a line or a network of lines, in particular the star lines. In the measurement of the phase voltages against the common reference point, the measured voltage can be used directly for power calculation.

By measuring all measurements against a common reference point, no electrical isolation is necessary in the load control circuit. The star-side arrangement makes it possible to dispense with additional measures for overvoltage protection as a rule or at least makes them relatively easy to achieve.

According to a further advantageous aspect of the invention, the semiconductor circuits can be driven by means of a control signal. The control signal may be formed by the regulating module. For example, the control signal may be a potential difference against the reference potential.

The control signal may be formed by a gate driver circuit. The regulating module may drive the gate driver circuit. This aspect also makes it possible to execute the load control circuit largely without electrical isolation.

Advantageously, the load control circuit can be supplied with energy from the supply voltage of the motor or through the communication interface. A corresponding voltage converter can optionally be provided for this purpose in the load control circuit.

According to a further advantageous aspect of the invention, the load control circuit can be arranged on, at or preferably in a motor terminal box of the motor and in particular in the cover of the motor terminal box. In this way, the load control circuit can be coupled into the phase legs on the star side without further changes to the motor.

DESCRIPTION OF THE FIGURES

In the following, the features and aspects of the invention will be explained in detail with reference to exemplary embodiments and with reference to the figures, in which.

DETAILED DESCRIPTION

Figure 1:
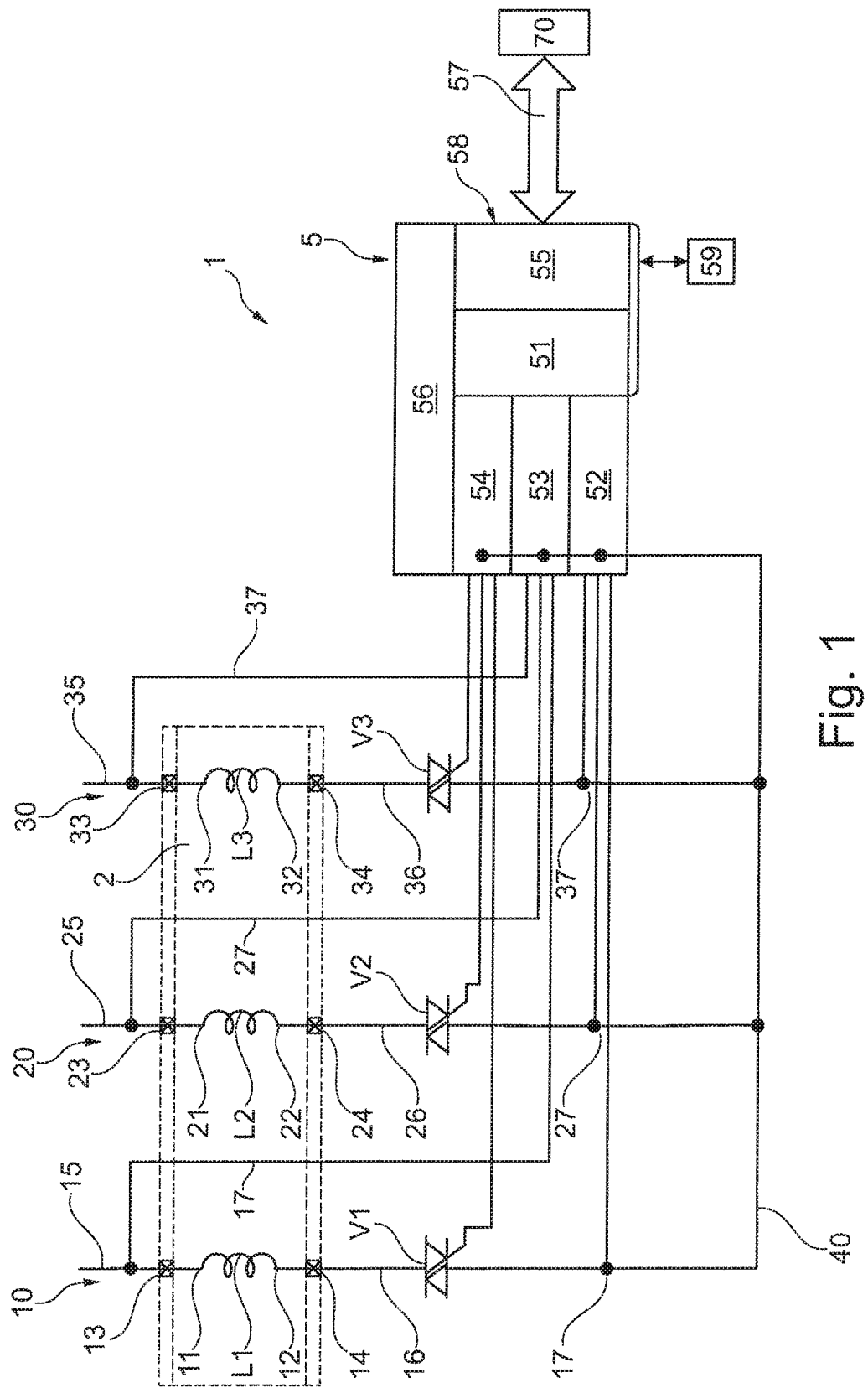
FIG. 1 shows a simplified schematic block diagram of a drive with a load control circuit.

FIG. 1 shows a simplified block diagram of a drive 1 with a load control circuit 5 according to the invention for a three-phase asynchronous motor 2 with a plurality of phase legs 10, 20, 30 connected in a star circuit.

A three-phase asynchronous motor 2 may have three or more phase legs 10, 20, 30. The number of phase legs depends on the three-phase system or the number of phases of the three-phase system and possibly also on the number of pole pairs of the three-phase asynchronous motor.

Three-phase asynchronous motor includes a stationary stator and a movable rotor. The rotor can rotate about an axis of rotation with a rotational degree of freedom, wherein it is driven by a rotating magnetic field. The rotating magnetic field is generated by field windings L1, L2, L3 of the stator arranged around the rotor.

The illustrated motor 2 has three field windings L1, L2, L3, each in separate phase legs 10, 20, 30 of the motor.

A phase leg 10, 20, 30 comprises respectively an outer conductor 15, 25, 35, the field windings L1, L2, L3 and star lines 16, 26, 36, which are connected in a star point 40. The star point is not necessarily actually to be understood as a point, but can also be formed, as shown, by a connected line system (in this case the star lines 16, 26, 36) having a common (star) potential.

The field windings L1, L2, L3 are also referred to as excitation windings. The field windings L1, L2, L3 each have a coil start 11, 21, 31 and a coil end 12, 22, 32. The outer conductors 15, 25, 35 are electrically connected to the coil starts 11, 21, 31 of the respective phase windings 10, 20, 30.

The connection of the first outer conductor 15, 25, 35 and the coil start 11, 21, 31 can be formed by outer conductor terminals 13, 23, 33. In fact, however, these do not necessarily have to be clamps in the actual sense, for which reason there is frequently also reference to an outer conductor connection point.

Alternatively, the outer conductor terminals 13, 23, 33 may also be referred to as coil start terminal.

The respective coil ends 12, 22, 32 are on the side of the field windings L1, L2, L3 facing away from the outer conductors 15, 25, 35. The respective star lines 16, 26, 36 are connected to the coil ends 12, 22, 32. The coil ends 12, 22, 32 and the respective star lines 16, 26, 36 are connected in a star line connection point 14, 24, 34, also referred to as a coil end connection point or coil end terminals.

A first semiconductor switch V1 is arranged in the first drive train 10 between the coil end 12 of the first field winding L1 and the star point 40. In other words, the star line 16 can be selectively interrupted by the first semiconductor switch V1.

In addition to the first semiconductor switch V1, a first ammeter 52 or a current measuring probe 17 of the ammeter 52 is also arranged in or on the first phase leg 10. Advantageously, the first current measuring probe 17 can be arranged in the first phase leg 10 between the coil end 12 and the star point 40. In other words, the current measuring probe 17 can be arranged in or on the star line 16.

The first current measuring probe 17 can be, for example, a shunt. Although Hall current sensors or fluxgate sensors can also be used, they are, however, more expensive and more complex. Furthermore, no electrical isolation by the sensor is necessary due to the advantageous selection of the star point as reference potential.

The second phase leg and the third phase leg are also constructed in a comparable manner:

The second field winding L2 is connected to a power supply, a three-phase power supply, via a connecting line 25. The coil start 21 is located on the outer conductor side, that is, on the side of the outer conductor 25. The first conductor 25 and the field winding L2 are conductively connected in an outer conductor connection point 23 (also called an outer conductor terminal). On the second side of the field winding L2 is the coil end 22, which is connected in a star line connection point 24 (also called coil end connection point or coil end terminal) by means of a star line 26 at a star point 40 to the other star lines 16, 36 of the respective other phase legs 10, 30.

The second phase leg can also be interrupted by a second semiconductor switch V2 between the coil end 22 and the star point 40.

A second current measuring probe 27 of the ammeter 52 measures the phase current in the second phase leg 20 in the region of the second star line 26. Similarly, the third phase leg 30 has a third outer conductor 35, an outer conductor terminal 33 and a third field winding L3 having a coil start 31 and a coil end 32, a coil end terminal 34 and a third star line 36 having a third semiconductor switch V3 and a third current measuring probe 37.

The configuration of the second and also of the third phase leg 20, 30 thus corresponds to the configuration of the first phase leg 10.

The first star line 16, the second star line 26 and the third star line 36 are electrically connected at a star point 40. They thus have a common reference potential.

As an alternative to a single first ammeter 52, the load control circuit 5 can also have separate ammeters for the further phase legs.

A first voltmeter 53 of the load control circuit 5 measures the phase voltages on the first phase leg 10, on the second phase leg 20 and on the third phase leg 30. In this case, the potential difference between the outer conductors 15, 25, 35 and the common star point 40 is measured. For this purpose, the instantaneous outer conductor potentials are picked up by the voltmeter 53 by means of the measuring lines 17, 27, 37 and compared to the star point potential at the star point 40.

A regulating module 51 further processes the data obtained from the ammeters and voltmeters and calculates an active power in the phase legs 1, 2 and/or 3.

If phase current and phase voltage on only one phase leg are measured, the active power is determined over the period duration of a half-wave or a multiple thereof and then multiplied by the number of phase legs in order to determine the total active power.

However, phase currents and phase voltages are advantageously measured in each of the phase legs.

By multiplying the instantaneous phase currents and the respective associated instantaneous phase voltage, an instantaneous active power can be determined for each of the phase legs. By adding the instantaneous active power for all phase legs 10, 20, 30, the total active power can be determined immediately (that is to say without first having to integrate over at least one half-wave of the three-phase system).

Furthermore, the torque that is output can be calculated directly from the total active power, knowing or estimating the motor speed, optionally taking into account a connected transmission.

From the comparison of a predefined limit value to the active power, the total active power or the torque calculated from the total active power, the regulating module can determine a limit value exceedance and, from the limit value exceedance, determine a faulty operating state of the drive train and/or the driven mechanical load.

In addition to the regulating module 51, the ammeter 52 and the voltmeter 53, the load control circuit 5 also has a gate driver circuit 54, which drives the semiconductor switches V1, V2, V3. A potential difference with respect to the common reference potential at star point 40 can be used as the control signal.

The regulating module is designed to drive the semiconductor switches V1, V2, V3 as power dividers of the respective phase legs 10, 20, 30. Effective voltage in the respective phase legs 10, 20, 30 can be set by means of the semiconductor switches V1, V2, V3 via a phase-fired control.

The regulating module has a soft-start control and a partial load control.

The soft-start control is designed to reduce the effective voltage in the respective phase legs when switched on and to increase it over a predetermined period of time to the full mains voltage. This can take place via a phase-fired control or via pulse width modulation.

The partial load control is designed to determine a partial load factor from the active power and a rated motor power. When a partial load factor limit value is determined, the effective voltages in the phase legs are correspondingly lowered. The lowering of the effective voltage may be proportional to the undershooting of the partial load factor limit value.

The load control circuit 5 may comprise a DC-DC converter 56 for voltage adjustment.

The load control circuit 5 further comprises a communication module 55. The communication module includes a communication interface 58. Through the communication interface 58, the communication module 55 may establish a data connection 57 with or in a (remote) system 70.

The data connection 57 may be established by the communication module 55 via a network, a field bus, or a point-to-point connection. The communication module provides, via the data connection 57, motor characteristics and/or motor state data, which in turn are kept available by the regulating module.

The power supply to the load control circuit 5 can be provided either via the three-phase system of the motor or via the data connection 57. For example, the data connection may be an IO link, or a network connection with Power-over-Ethernet.

The load control circuit 5 comprises a corresponding voltage converter for supplying power to the ammeter and voltmeter 52, 53, the regulating module 51, the gate driver circuit 54 and the communication module 55.

Via communication interface 58, the communication module 55 may communicate with a remote system. For example, the communication interface 58 may be connected to a bus system, to a network, or to a point-to-point connection, such as, for example, in the case of an IO link.

The drive is made "industry 4.0"—compliant by the communication module 55. Via the polling of load profiles, the future energy requirement can be deduced with knowledge of historical data. The necessary energy requirement can be optimized using these data.

According to a further advantageous aspect, the drive characteristic data can be stored in, for example, a nonvolatile memory 59. The non-volatile memory 59 can be arranged directly in or on the drive 1. The non-volatile memory 59 can remain on the drive 1 even if, for example, the load control circuit 5 has to be replaced due to a defect. The load control circuit 5 can be set up to read out the nonvolatile memory 59 and to adopt drive characteristic data.

The drive characteristics data may include motor characteristics and/or transmission characteristics of an electronic identification plate of the drive 1; thereby, the drive characteristics can correspond to the "eCl@ss" classification.

The drive state data may include load profile data and/or predictive maintenance (wear parameters) state data.

According to a further advantageous aspect, the drive 1 can be designed to be controlled by means of the control data of the remote system 70 via the data connection 57 and in particular to be switched on and off.

As an alternative to the arrangement shown with a first voltmeter 53 and a first ammeter 52 which measures at least the phase voltage and the phase current in a first phase leg 10 and in the shown exemplary embodiment also measures, in addition to the first phase voltage and the first phase current, phase voltages and phase currents for the further phase legs, the load control circuit can also have separate voltmeters 53 and ammeters 52 for each of the phase legs 10, 20, 30 (not shown).

Figure 2:
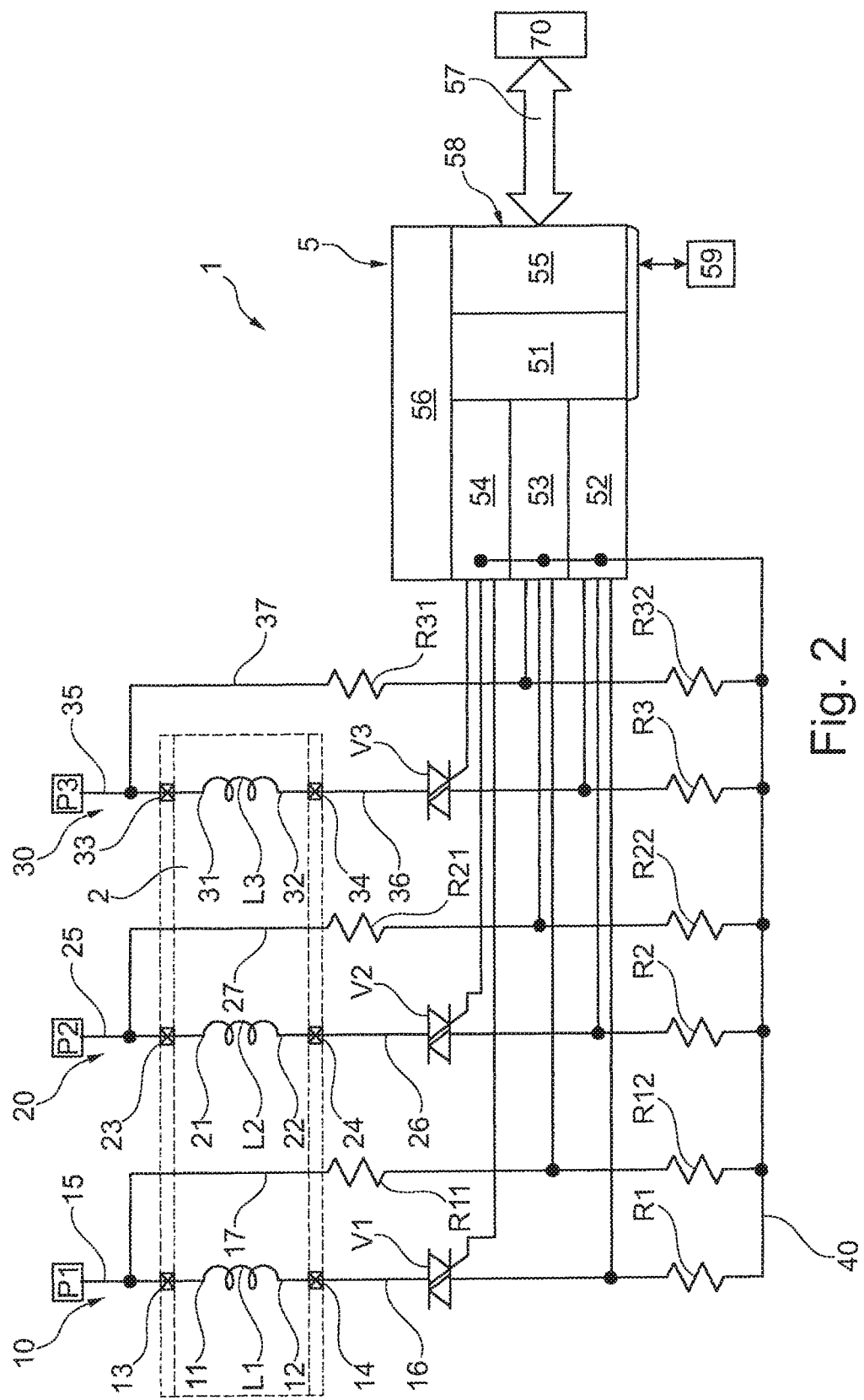
FIG. 2 shows another simplified schematic block diagram of a drive with a load control circuit.

FIG. 2 also shows a drive 1 with a motor 2 and a load control circuit 5 as a simplified block diagram.

The configuration of the load control circuit essentially corresponds to the load control circuit 5 of FIG. 1, wherein only the differences are discussed below. Identical or comparable features are provided with the same reference characters.

The current measuring probes 17, 27, 37 are formed here by the shunt resistors R1, R2, R3. The shunt resistors R1, R2, R3 are connected in series to the respective phase legs 10, 20, 30 and are connected to the star point 40 on the star side. The respective phase current is determined from the shunt voltages dropping across the shunt resistors R1, R2, R3. The star point potential is used as a common reference potential by the circuit arrangement.

The respective phase voltages at the phase legs 10, 20, 30 or, more specifically, across the field windings L1, L2, L3 are determined by the voltmeter 53 by means of voltage dividers connected in parallel to the phase legs.

The voltage dividers 17, 27, 37 each have a first resistor R11, R21, R31 and a second resistor R12, R22, R32. The first resistors R11, R21, R31 are connected to the respective outer conductors 15, 25, 35 and the second resistors R12, R22, R32 respectively connected in series to the first resistors R11, R21, R31 are connected at the star point 40 and thus are likewise at the common reference potential. The voltage drop across the respective second resistors R12, R22, R32 is measured using the voltmeter 53.

In this way, both the ammeters and the voltmeters can be designed cost-effectively as voltmeters. Electrical isolation can be omitted by the common reference potential.

Figure 3:
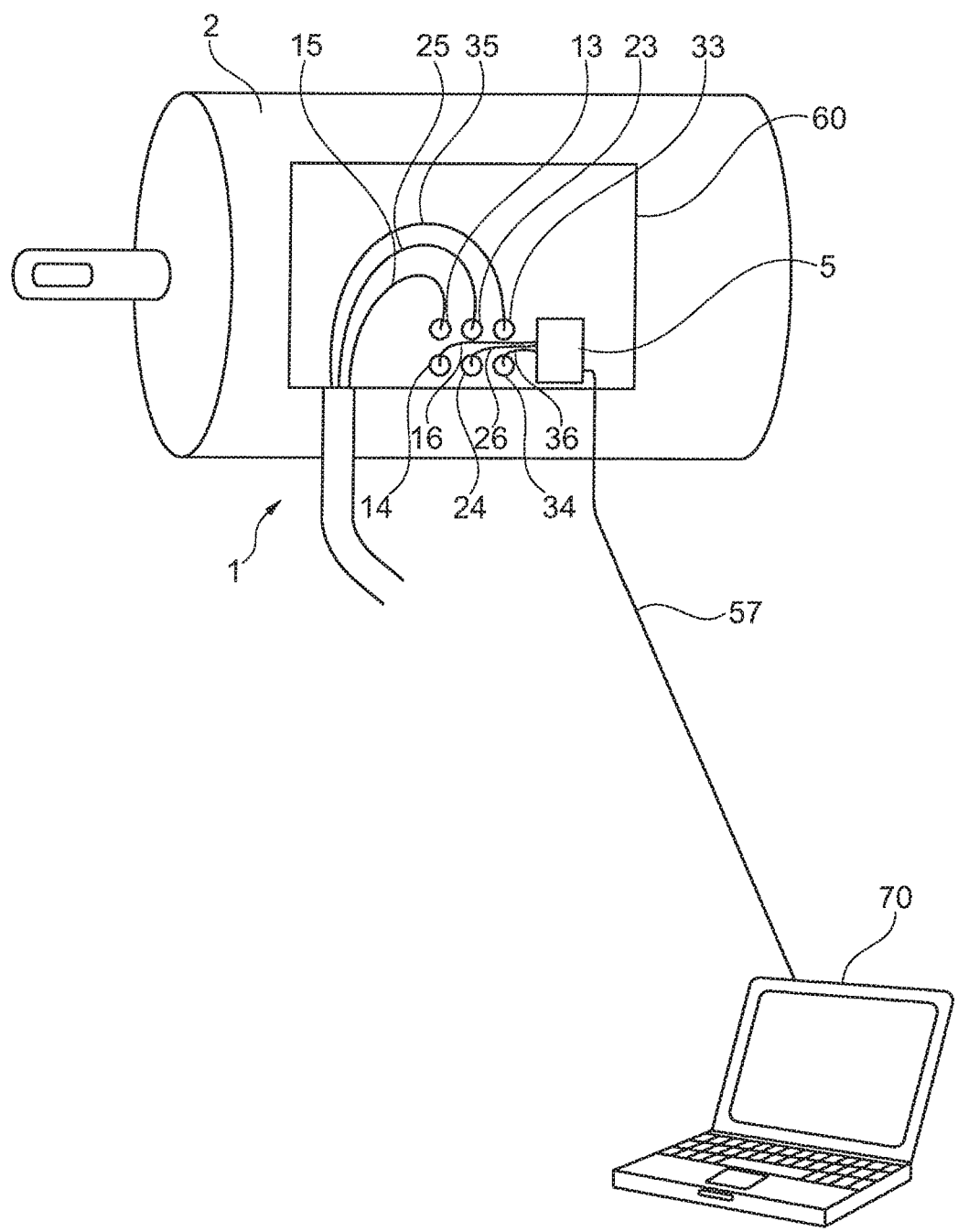
FIG. 3 shows a three-phase asynchronous motor with a load control circuit.

FIG. 3 shows a motor of a drive with a load control circuit according to the invention in the motor terminal box. The arrangement in the motor terminal box 60 makes it possible to directly connect the load control circuit 5 to the respective outer conductor terminals and coil end terminals of the motor 2, so that a further structural adaptation of the motor 2 itself is not necessary.

The outer conductors 15, 25, 35 are connected to the outer conductor terminals 13, 23, 33. Star lines 16, 26, 36 are connected to the coil end terminals 14, 24, 34 and lead to the load control circuit 5. The load control circuit 5 is accommodated in the clamping box 60 together with the outer conductor terminals and the coil end terminals. A communication line 57 leads to a remote system 70.

Figure 4:
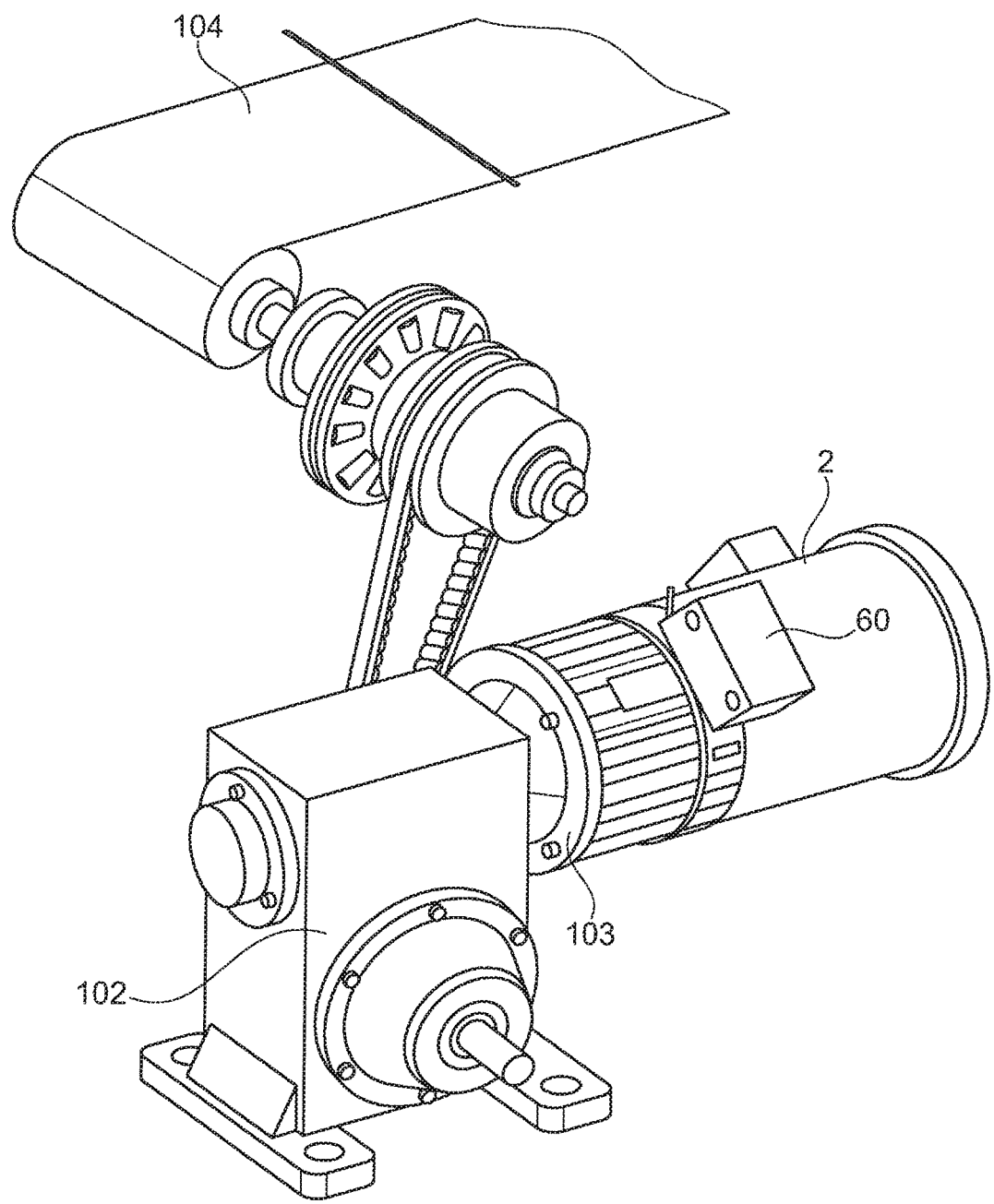
FIG. 4 shows a drive train.

FIG. 4 shows a drive train with a motor 2. A transmission 102 is coupled in between the motor 2 and the driven mechanical load 104. An overload clutch 103 is coupled between the motor 2 and the transmission 102.

The motor 2 has a terminal box 60.

The unit made up of motor 2 and transmission 102, as well as a non-transmission motor, may be understood as a drive in the sense of the present description.

According to the invention, the load control circuit 5 is accommodated in the terminal box 60. The illustrated overload clutch 103 is thus dispensable and can be omitted.

Of course, the drive or the drive train can also be designed without a transmission. The illustrated transmission 102 is in that case omitted.

The invention claimed is:

1. A drive with integrated dynamic load control, comprising:
    a mains-fed three-phase asynchronous motor having three phase legs connected in a star circuit, wherein the phase legs each have at least one field winding with an outer conductor-side coil start and a coil end, and are connected in a common star point;
    a load control circuit having a regulating module and a first ammeter, a first voltmeter, a first semiconductor switch and a second semiconductor switch;
    wherein the first ammeter is designed to detect a first phase current in a first phase leg of the motor,
    wherein the first voltmeter is designed to detect a first phase voltage at the first phase leg, and
    wherein the regulating module is designed to calculate an active power of the first phase leg and a total active power of the motor by means of the first phase current and the first phase voltage; and
    wherein the first and the second semiconductor switches are arranged in two of the three phase legs between the respective coil end and the common star point, and
    wherein the regulating module is designed to interrupt the two of the three phase legs by means of the first and the second semiconductor switches upon detection of a limit value exceedance when the active power, the total active power or a torque calculated from the total active power exceeds an adjustable limit value.

2. The drive according to claim 1, wherein the first ammeter is designed to detect the first phase current in the first phase leg between the coil end and the common star point.

3. The drive according to claim 2, wherein the first ammeter determines the first phase current by means of a first shunt, wherein the first shunt is arranged in the first phase leg connected in series between the coil end and the common star point.

4. The drive according to claim 1, wherein the first voltmeter is designed to detect the first phase voltage in the first phase leg between the coil start of the field winding and the common star point.

5. The drive according to claim 1,
wherein the first ammeter is designed to detect an associated phase current in each phase leg,
wherein the first voltmeter is designed to detect an associated phase voltage at each phase leg, and
wherein the regulating module is designed to calculate a total active power by means of the respective phase currents and the respective phase voltages; and
wherein the regulating module is designed to interrupt all of the phase legs by means of the first and second semiconductor switches when the limit value exceedance is detected.

6. The drive according to claim 5, further comprising a third semiconductor switch arranged in another of the three phase legs between the coil end of the another phase leg and the common star point, wherein the regulating module is designed to control the first, second and third semiconductor switches as power dividers in such a way that effective voltages in the phase legs can be set by means of the first, second and third semiconductor switches via a phase-fired control.

7. The drive according to claim 6, wherein the regulating module comprises a soft-start control, and wherein the soft-start control is designed to reduce the effective voltages in the phase legs when switched on and to increase the effective voltages over a predetermined period of time up to a full line voltage.

8. The drive according to claim 6, wherein the regulating module has a partial load control, and wherein the partial load control is designed to determine a partial load factor from the active power and a rated motor power, and, when an undershooting of a partial load factor limit value is determined, to correspondingly lower the effective voltages in the phase legs.

9. The drive according to claim 1, wherein the first phase current and the first phase voltage are measured against a common reference point, in particular wherein the common reference point is the common star point and has a reference potential, and wherein the first and second semiconductor switches are driven by means of a control signal and the control signal is a potential difference relative to the reference potential.

10. The drive according to claim 1, wherein the load control circuit comprises a communication module, and wherein the communication module is designed to transmit drive characteristics and/or drive state data to a remote system and/or receive control data of the remote system.

11. The drive according to claim 10, wherein the input characteristics include motor characteristics and/or transmission characteristics of an electronic identification plate of the drive.

12. The drive according to claim 10, wherein the drive state data comprises load profile data and/or predictive maintenance state data.

13. The drive according to claim 10, wherein by means of the control data the drive can be controlled in terms of power and can be switched on and off.

14. The drive according to claim 1, wherein the three-phase asynchronous motor comprises a motor terminal box, and wherein the load control circuit is arranged in or on or at the motor terminal box.

15. A drive train comprising a drive according to claim 1, wherein the drive comprises a transmission, and wherein the drive train further comprises further coupling means and a driven mechanical load.

\* \* \* \* \*